May 24, 1960 M. MORSE 2,938,070
MOISTURE-PROOFING DEVICE FOR ELECTRICAL APPARATUS
Original Filed May 11, 1953
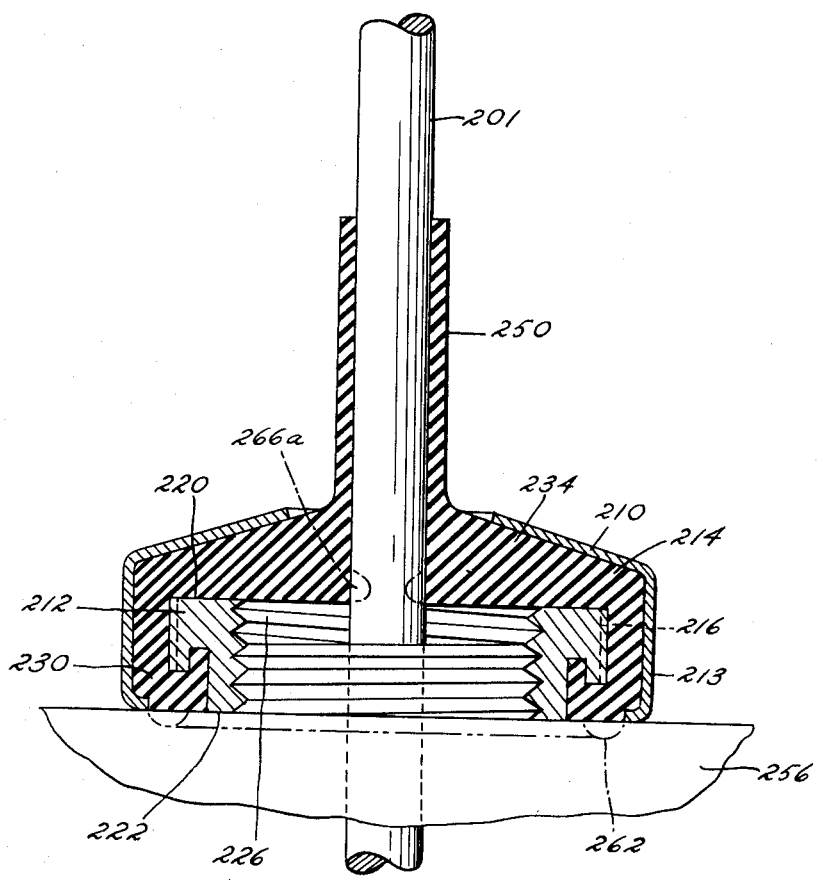
Milton Morse

United States Patent Office 2,938,070
Patented May 24, 1960

2,938,070
MOISTURE-PROOFING DEVICE FOR ELECTRICAL APPARATUS

Milton Morse, 252 Hawthorne Ave., Yonkers 5, N.Y.

Original application May 11, 1953, Ser. No. 354,052, now Patent No. 2,795,144, dated June 11, 1957. Divided and this application Apr. 1, 1957, Ser. No. 651,486

1 Claim. (Cl. 174—151)

This application is a division of my copending application Serial No. 354,052, filed May 11, 1953, and now U.S. Patent No. 2,795,144.

This invention relates generally to moisture-proofing devices, and more particularly to a resilient moisture-proof structure adapted to prevent the entry of fluids such as air, and water vapor into electrical devices.

In various communications equipment, there is usually a large number of electrical conductors which are mounted through a solid panel encasing the equipment. This equipment is vulnerable to the effects of air, moisture and/or liquids, and where the equipment is mounted on aircraft, vehicles, or vessels, into which water or gas may penetrate, the equipment would be rendered useless due to such penetration.

It is therefore among the principal objects of the present invention to provide hermetic sealing devices for conductors which extend through a wall in a casing which will protect the encased equipment by preventing fluids from entering the casing surrounding the equipment at the area of connection between the device and the casing.

Another object of the present invention lies in the provision of water-proofing structure which may be expediently installed and removed as a single unit, and without the use of special tools or skill.

A feature of the invention lies in the fact that the same may be installed upon and removed from about a mounted conductor by using only the fingers of the hand, or if a particularly tight fit is required, by means of an ordinary socket wrench.

Another feature of the invention lies in the fact that the metal and resilient parts comprising the device are formed by molding the latter about the former, thereby forming a unit which is not easily damaged or torn apart.

The invention also is useful in maintaining a substantially vapor-proof seal about switches associated with hermetically sealed cabinets.

At high altitudes in aircraft and rockets the present devices prevent reverse leakage of the gas normally under pressure in the equipment cabinet, preventing reduction of pressure with consequent arcing and explosion of condensers.

These objects and features, as well as other incidental ends and advantages, will become more clearly apparent during the course of the following disclosure, and be pointed out in the appended claim.

On the drawings, to which reference will be made in the specification, the single figure is a vertical sectional view of an embodiment of the invention.

In accordance with the invention, the device comprises broadly: a nut element 212, and a boot element 214.

The nut element 212 is preferably formed from machined brass or other suitable metal. It is of irregular configuration, being bounded by a serrated peripheral edge 216, a top surface 220, and a lower surface 222. A threaded centrally disposed bore 226 extends from the lower surface 222 to the top surface 220 and is of a pitch and thread size corresponding to that of a threaded bushing (not shown) with which the device is engageable.

The boot element 214 includes a nut enclosing member 230 upon which there is integrally formed a resiliently deformable member 262.

The nut enclosing member 230 is molded directly upon the nut element 212, and includes a top portion 234, and an inwardly directed annular flange 266a which slideably engages the exterior surface of a conductor 201.

Extending upwardly from the flange 266a is an elongated top portion 250, the uppermost part of which is open. The flange 266a is shown in dot-dash line in its uncompressed position. Operation of the device may be facilitated by the addition of a suitable lubricant (not shown) on the conductor 201, and which will have a non-deteriorating effect on the material of which the boot element 214 is composed.

Thus the top portion 250 forms an open bore having a first outer end and a second inner end communicating with the threaded bore 226, and the flange 266a forms a seal preventing the entry of moisture through the top portion 250 once a conductor has been engaged therein.

Where desired, the electrical conductor 201 may be substituted by a switch-operating shaft of the type employing short-stroke reciprocatory movement (not shown).

I wish it to be understood that I do not consider the invention limited to the exact details of structure shown and set forth in this specification, for obvious modifications will occur to those skilled in the art to which the invention pertains.

I claim:

A moisture proofing and sealing device for use with a wirelike conductor, and a barrier having an opening therein, said moisture proofing and sealing device comprising: a nut element and a boot element, said nut element having a threaded bore therein, said boot element having a hollow recess therein at least partially enclosing said nut element, and overlying a portion of said threaded bore; said boot element having means forming an open bore, having a principal axis of substantially constant diameter, said bore having a first outer end and a second inner end communicating with said threaded bore, said means constricting itself about said wirelike conductor, said bore having a radially expandable annular flange at said second inner end thereof.

References Cited in the file of this patent

UNITED STATES PATENTS

| | | |
|---|---|---|
| 2,383,018 | Shere | Aug. 21, 1945 |
| 2,462,023 | Johanson et al. | Feb. 15, 1949 |
| 2,690,470 | Moorhead | Sept. 28, 1954 |